(12) United States Patent
Chang et al.

(10) Patent No.: US 11,801,807 B1
(45) Date of Patent: Oct. 31, 2023

(54) END CAP ASSEMBLY STRUCTURE OF WINDSHIELD WIPER

(71) Applicant: DANYANG UPC AUTO PARTS CO., LTD., Jiangsu (CN)

(72) Inventors: Che-Wei Chang, Jiangsu (CN); Cheng-Kai Yang, Jiangsu (CN); Chuan-Chih Chang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 17/968,582

(22) Filed: Oct. 18, 2022

(51) Int. Cl.
*B60S 1/38* (2006.01)

(52) U.S. Cl.
CPC .......... *B60S 1/3889* (2013.01); *B60S 1/3887* (2013.01); *B60S 1/3894* (2013.01); *B60S 2001/3843* (2013.01)

(58) Field of Classification Search
CPC .... B60S 1/3886; B60S 1/3887; B60S 1/3889; B60S 1/3891; B60S 1/3894
USPC ......... 15/250.43, 250.452, 250.453, 250.454
See application file for complete search history.

(56) References Cited

U.S. PATENT DOCUMENTS

| | | | | |
|---|---|---|---|---|
| 8,341,801 B2 * | 1/2013 | Coos | ..................... | B60S 1/3889 |
| | | | | 15/250.43 |
| 8,402,593 B2 * | 3/2013 | Boland | ................... | B60S 1/381 |
| | | | | 15/250.43 |
| 2015/0343997 A1 * | 12/2015 | Foss | ......................... | B60S 1/38 |
| | | | | 15/250.201 |
| 2017/0341627 A1 * | 11/2017 | Laurens | ................ | B60S 1/3889 |

FOREIGN PATENT DOCUMENTS

| | | | |
|---|---|---|---|
| DE | 102007058091 | * | 6/2009 |
| FR | 2994916 | * | 3/2014 |
| KR | 10-1166494 | * | 7/2012 |
| WO | 2012/139643 | * | 10/2012 |

OTHER PUBLICATIONS

Machine translation of description portion of French publication 2994916, published Mar. 2014. (Year: 2014).*

* cited by examiner

*Primary Examiner* — Gary K. Graham
(74) *Attorney, Agent, or Firm* — Chun-Ming Shih; HDLS IPR SERVICES

(57) ABSTRACT

This disclosure is an end cap assembly structure. The elastic arms are inserted in the guiding shield. The wiper strip is inserted between the elastic arms. The end cap is adapted to sheathe the ends of the guiding shield and the elastic arms, and the wiper strip is exposed from the end cap. The end cap includes a shell, posts and blocks. The posts are disposed in the shell. The blocks are disposed on two sides of the shell. The elastic arms are combined with the guiding shield and the wiper strip, and inserted in the end cap. The posts clamp the clamping slots of the elastic arms, and the blocks snap the snapping holes of the elastic arms.

7 Claims, 8 Drawing Sheets

END CAP ASSEMBLY STRUCTURE OF WINDSHIELD WIPER

BACKGROUND OF THE DISCLOSURE

Technical Field

The technical field relates to a windshield wiper, and more particularly relates to an end cap assembly structure of the windshield wiper.

Description of Related Art

A related-art of windshield wiper usually includes a latch seat, metal elastic sheets, a guiding shield and a wiper strip. The latch seat is combined with metal elastic sheets and the wiper strip, and then the guiding shield is installed on the latch seat connected with the wiper arm. Accordingly, the wiper arm drives the wiper strip move to clean the surface of the windshield.

Moreover, the combination between the guiding shield and the metal elastic sheet is not sealed. As a result, rainwater may easily penetrate from sides of the guiding shield to infiltrate the metal elastic sheet, and that may cause the metal elastic sheet to be corroded easily, and the service life is shortened. Hence, in the related art, the windshield wiper has end caps installed on ends of the metal elastic sheets to cover the ends of the guiding shield. However, most end caps of the related-art are in a manner of sheathing the ends of the metal elastic sheets and the wiper strip, and the end caps may escape due to the aging of the wiper strip after a long time of use.

In view of the above drawbacks, the inventor proposes this disclosure based on his expert knowledge and elaborate researches in order to solve the problems of related art.

SUMMARY OF THE DISCLOSURE

One object of this disclosure is to provide an end cap assembly structure of a windshield wiper, which the posts of the end cap clamp the clamping slots of the elastic arms, and the blocks of the end cap snap the snapping holes of the elastic arms. Therefore, the end cap may be firmly fixed on the ends of the guiding shield and the elastic arms.

In the embodiment of this disclosure, this disclosure is an end cap assembly structure of a windshield wiper, the end cap assembly structure includes a guiding shield, a pair of elastic arms, a wiper strip and an end cap. The pair of elastic arms are inserted in the guiding shield. Each elastic arm includes a metal sheet, a snapping hole and a clamping slot. The snapping hole is disposed on the metal sheet, and the clamping slot is disposed on one end of the metal sheet. The wiper strip is inserted between the pair of elastic arms and extended along the elastic arms. The end cap is adapted to sheathe ends of the guiding shield and the pair of elastic arms, and the wiper strip is exposed from the end cap. The end cap includes a shell, a pair of posts and a pair of blocks. The pair of posts are disposed in the shell and are located at one end of the shell. The pair of blocks are respectively disposed on two sides of the shell and located on a rear side of the pair of posts. The pair of elastic arms are combined with the guiding shield and the wiper strip and are inserted in the end cap. The pair of the posts clamp clamping slots of the pair of elastic arms, and each of the blocks correspondingly snap the snapping hole of each of the pair of elastic arms.

In comparison with the related art, the end cap assembly structure of the windshield wiper in this disclosure is disposed with the snapping holes and clamping slots on the elastic arms. On the other hand, the end cap is disposed with the posts and blocks correspondingly. When the elastic arms are combined with the guiding shield and the wiper strip and are inserted into the end cap, the posts of the end cap clamp with the clamping slots of the elastic arms to restrict and position the left, right, front and rear directions of the end cap. Additionally, the blocks of the end cap correspondingly snap the snapping holes of the elastic arms to restrict and position the up and down directions of the end cap. Therefore, the end cap may be firmly fixed on the ends of the guiding shield and the elastic arms to increase the convenience of assembly.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
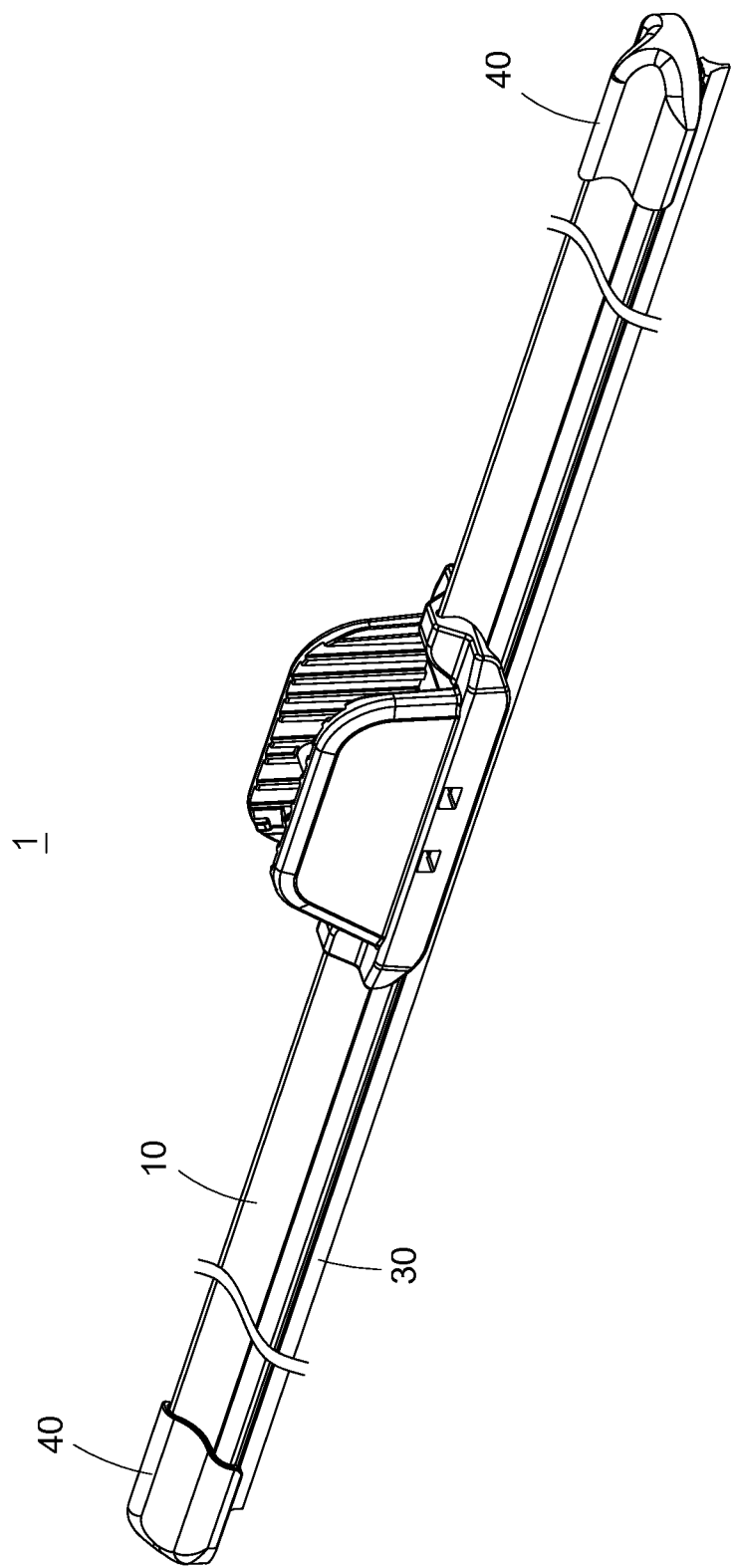
FIG. 1 is a perspective schematic view of the end cap assembly structure of windshield wiper in this disclosure.
Figure 2:
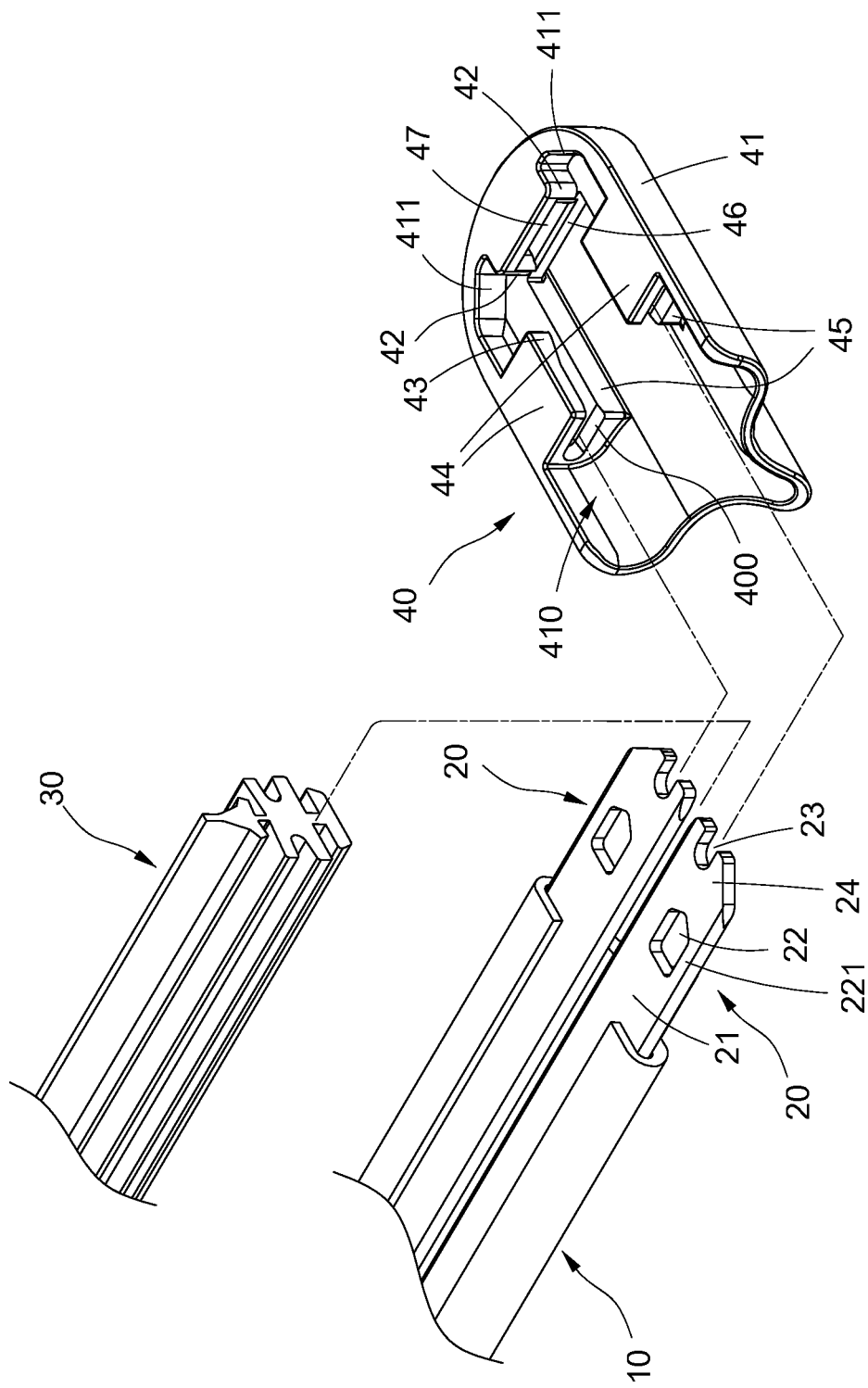
FIG. 2 is a perspective exploded view of the end cap assembly structure of windshield wiper in this disclosure.

Please refer to FIG. 1 and FIG. 2, which depict a perspective schematic view and a perspective exploded view of the end cap assembly structure of windshield wiper in this disclosure. This disclosure provides an end cap assembly structure of the windshield wiper 1, the end cap assembly structure includes a guiding shield 10, a pair of elastic arms 20, a wiper strip 30 and an end cap 40. The pair of elastic arms 20 are inserted in the guiding shield 10. One side of the wiper strip 30 is fixed between the pair of elastic arms 20, and another side of the wiper strip 30 is exposed from the guiding shield 10. Additionally, the end cap 40 is adapted to sheathe the ends of the guiding shield 10 and the elastic arms 20. Therefore, the pair of elastic arms 20 are combined with the guiding shield 10 and the wiper strip 30 and are inserted in the end cap 40 to complete the end plug assembly structure of the windshield wiper 1.

As shown in FIG. 2, the pair of elastic arms 20 are inserted in the guiding shield 10. Each elastic arm 20 includes a metal sheet 21, a snapping hole 22 and a clamping slot 23. The snapping hole 22 is disposed on the metal sheet 21 and is located in the middle position of the cross section of the metal sheet 21. The elastic arm 20 includes a flat section 221 located from the edge of the snapping hole 22 to the side of the metal sheet 21. The clamping slot 23 is disposed on one end of the metal sheet 21. In this embodiment, the snapping hole 22 is substantially in a pentagon shape. Additionally, the clamping slot 23 is defined in a semi-elliptical shape.

Moreover, the wiper strip 30 is inserted between the pair of elastic arms 20 and extended along the pair of elastic arms 20.

Furthermore, the end cap 40 is adapted to sheathe the ends of the guiding shield 10 and the elastic arms 20, and the wiper strip 30 is exposed from the end cap 40. The end cap 40 includes a shell 41, a pair of posts 42 and a pair of blocks 43. The pair of posts 42 are disposed in the shell 41 and are located at one end of the shell 41. In addition, the pair of blocks 43 are respectively disposed on two sides of the shell 41 and are located on the rear side of the pair of posts 42.

In this embodiment, the end cap 40 includes a pair of wing plates 44 disposed on the shell 41, and the pair of blocks 43 are correspondingly located on the pair of wing plates 44. The end cap 40 includes a pair of platforms 45 disposed inside the shell 41, and a gap 400 is formed between the pair of platforms 45 and the pair of wing plates 44. Moreover, the end cap 40 includes a supporting plate 46 disposed between the pair of platforms 45. The supporting plate 46 is connected to the pair of platforms 45 and supports the pair of posts 42.

Further, the pair of blocks 43 are respectively disposed on the sides of the pair of wings 44 facing the pair of platforms 45, and the pair of blocks 43 respectively protrude from the ends of the pair of wing plates 44 facing the pair of posts 42. Additionally, a holding slot 47 is formed between the pair of posts 42.

In this embodiment, each elastic arm 20 includes an inclined guiding block 24 disposed on one side of the clamping slot 23. Additionally, the shell 41 of the end cap 40 includes a chamfered surface 411 on one side of each post 42. Moreover, the shell 41 includes a sliding slot 410 disposed on one side of each of the platforms 45 respectively.

Figure 3:
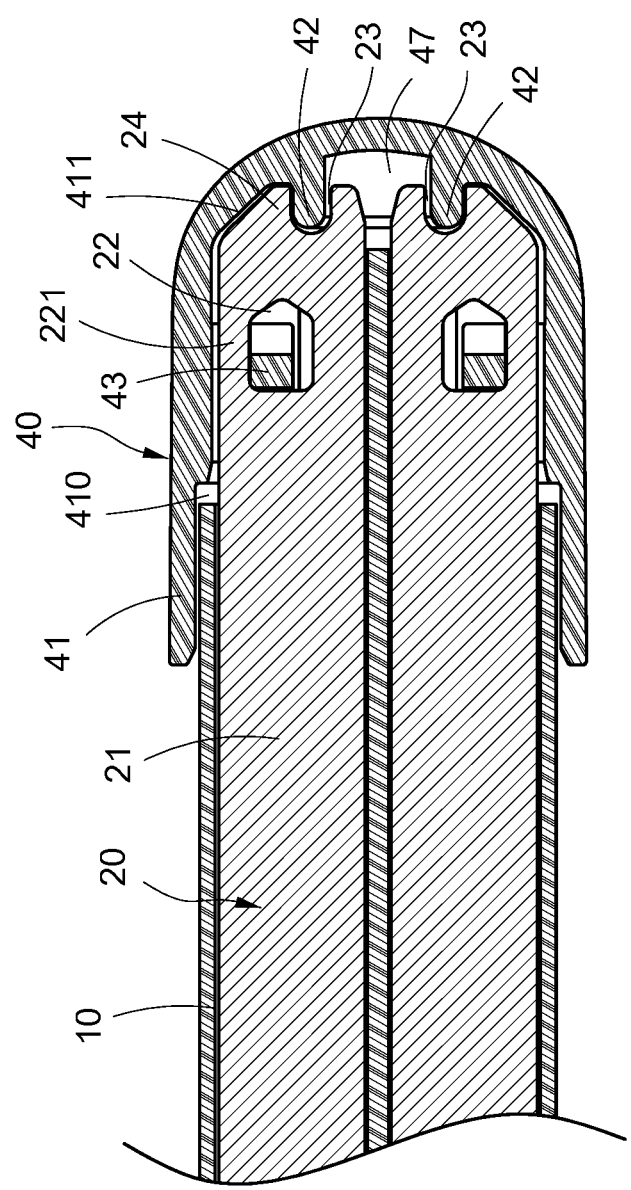
FIG. 3 to FIG. 6 are cross sectional views of the end cap assembly structure of windshield wiper in this disclosure.

Please further refer to FIG. 3 to FIG. 6, they depict cross sectional views of the end cap assembly structure of windshield wiper in this disclosure. As shown in FIG. 3, the pair of elastic arms 20 are inserted into the end cap 40 after combining with the guiding shield 10 and the wiper strip 30. Specifically, each of the elastic arms 20 is inserted in the gap 400 between the pair of platforms 45 and the pair of wing plates 44. Then, the posts 42 of the end cap 40 may clamp the clamping slots 23 of the elastic arms 20, and one side of the clamping slot 23 of each elastic arm 20 abuts against the holding slot 47. Therefore, the left, right, front and rear directions of the end cap 40 are restricted and positioned by the clamping of the pair of elastic arms 20.

It is worth noticing that the inclined guiding block 24 of each elastic arm 20 abuts against the chamfered surface 411 of the end cap 40. Furthermore, a part of the guiding shield 10 is inserted in the sliding slot 410 of the shell 41 to enhance the combination of the guiding shield 10 and the end cap 40.

Figure 4:
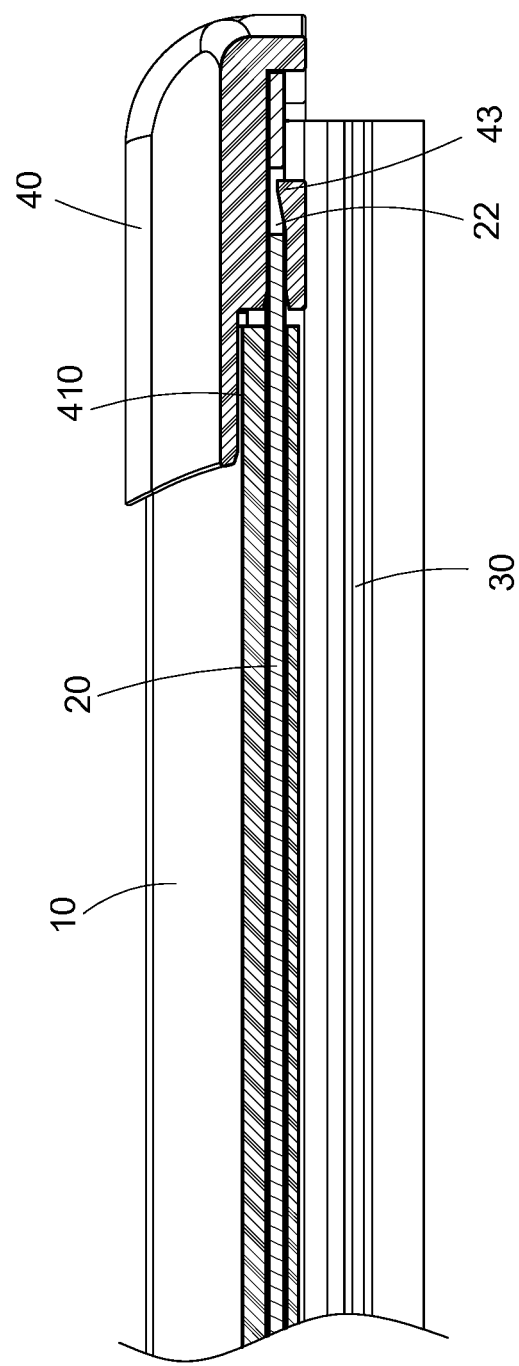

Please further refer to FIG. 4, the pair of elastic arms 20 are inserted in the end cap 40, and each block 43 of the end cap 40 may correspondingly snap the snapping hole 22 of each elastic arm 20. Therefore, the up and down directions of the end cap 40 are restricted and positioned by the clamping of the pair of elastic arms 20.

Figure 5:
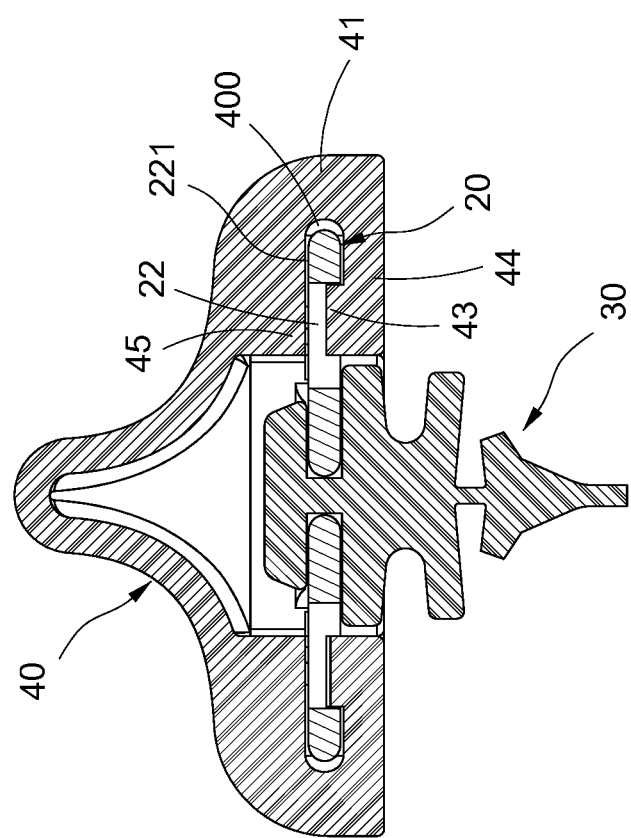

As shown in FIG. 5, in one embodiment of this disclosure, the snapping hole 22 is located in the middle position of the cross section of the metal sheet 21, and the flat section 221 is disposed on a side of the snapping hole 22. The arrangement of the flat section 221 has an effect of cantilever. As a result, the structure of the snapping hole 22 may become more flexible to prevent the blocks 43 from disengaging from the snapping hole 22.

Figure 6:
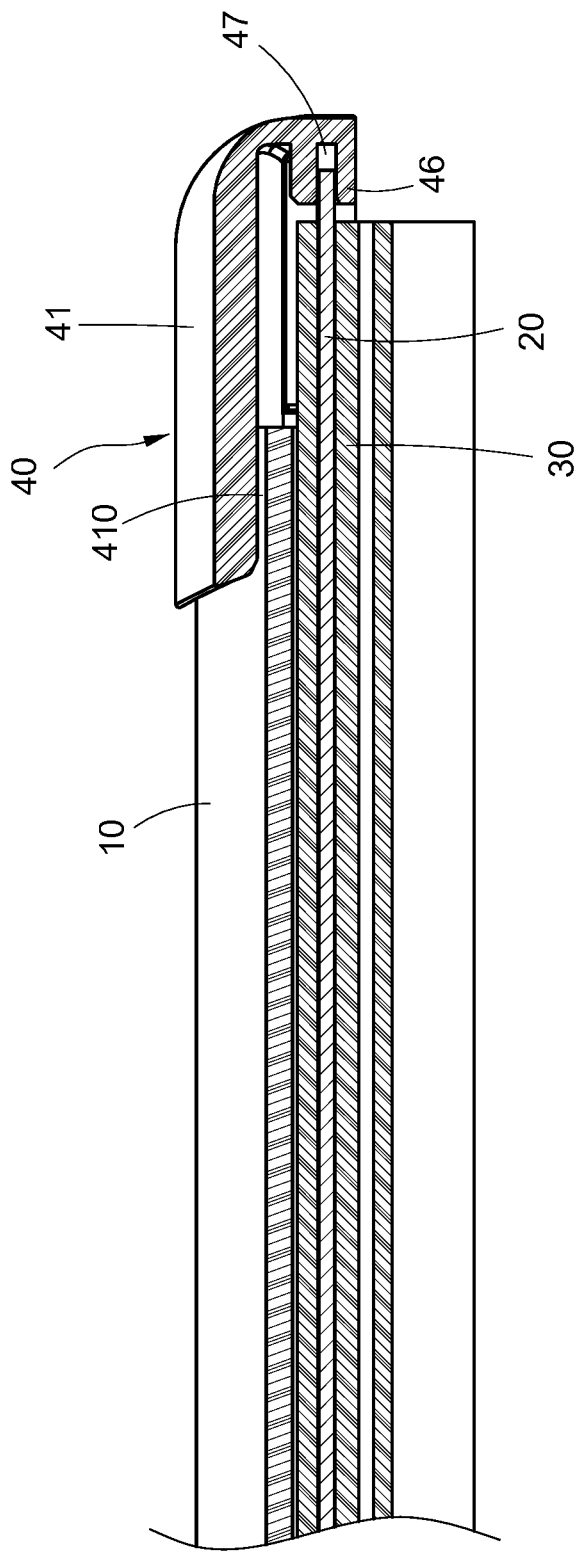

Please further refer to FIG. 6, the end cap 40 is adapted to sheathe the ends of the guiding shield 10 and the elastic arms 20, and the wiper strip 30 is exposed from the end cap 40. Therefore, the wiper strip 30 may scrape the surface of the windshield.

Figure 7:
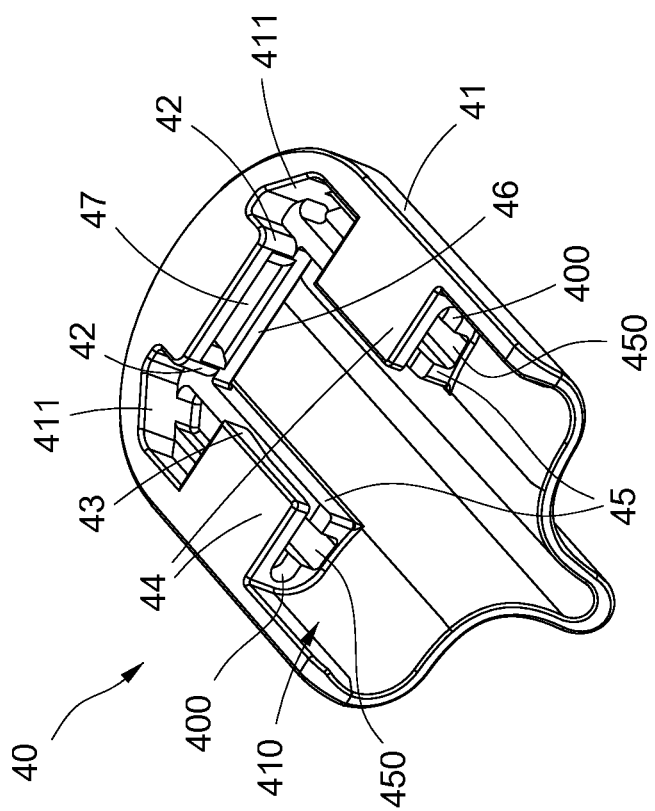
FIG. 7 is another embodiment of the end cap in this disclosure.

Please refer to FIG. 7, it depicts another embodiment of the end cap in this disclosure. This embodiment is similar to the end cap of FIG. 2, and the difference is that each of the pair of platforms 45 includes a groove 450. The arrangement of the grooves 450 is to prevent the surface of the end cap 40 from shrinking during manufacture to increase the effect of aesthetics and to reduce the cost. In some embodiment, the end cap 40 may not be disposed with the groove 450.

Figure 8:
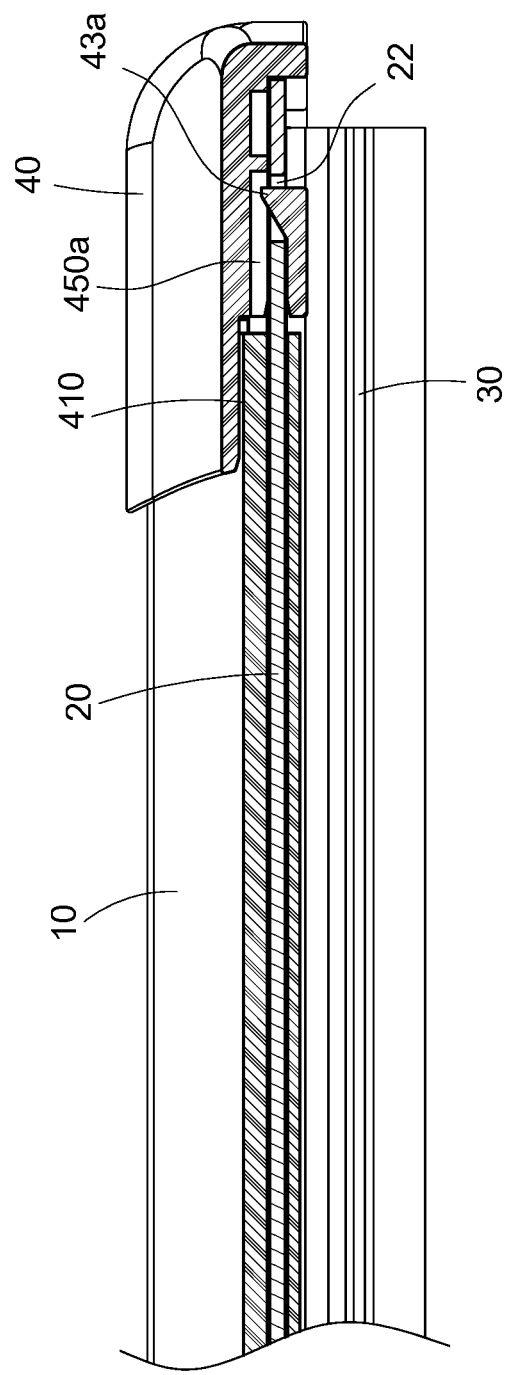
FIG. 8 is still another embodiment of the end cap in this disclosure.

Please further refer to FIG. 8, it depicts still another embodiment of the end cap in this disclosure. This embodiment is similar to the end cap of FIG. 7, and the difference is that the block 43a of the end cap 40 is disposed corresponding to the groove 450a of each platform 45. Accordingly, each block 43a may be extended to snap the groove 450a. Thus, the blocks 43 may be prevented from disengaging from the snapping holes 22 when the wing plates 44 are deformed under an external force.

While this disclosure has been described by means of specific embodiments, numerous modifications and variations could be made thereto by those skilled in the art without departing from the scope and spirit of this disclosure set forth in the claims.

What is claimed is:

1. An end cap assembly structure of a windshield wiper, the end cap assembly structure comprising:
    a guiding shield;
    a pair of elastic arms, inserted in the guiding shield, each elastic arm comprising a metal sheet, a snapping hole and a clamping slot, wherein the snapping hole is defined on the metal sheet, and the clamping slot is disposed on an end of the metal sheet;
    a wiper strip, inserted between the pair of elastic arms and extended along the pair of elastic arms; and
    an end cap, adapted to sheathe ends of the guiding shield and the pair of elastic arms, the wiper strip exposed from the end cap, the end cap comprising a shell, a pair of posts and a pair of blocks, wherein the pair of posts are disposed in the shell and located at one end of the shell, and the pair of blocks are respectively disposed on two sides of the shell and located on a rear side of the pair of posts;
    wherein the pair of elastic arms are combined with the guiding shield and the wiper strip, and are inserted in the end cap; the pair of posts and multiple clamping slots clamp with each other, and each of the blocks correspondingly snaps the snapping hole of each of the elastic arms;
    wherein the end cap comprises a pair of wing plates disposed on the shell, and the pair of blocks are correspondingly located on the pair of wing plates;
    wherein the end cap comprises a pair of elongated platforms disposed inside the shell and defining longitudinal extending inner edges, and a gap is defined between the pair of platforms and the pair of wing plates;
    each of the elastic arms is inserted in the gap, and the pair of blocks respectively protrude from ends of the pair of wing plates facing the pair of post;

wherein the end cap comprises a supporting plate disposed and extending between the longitudinal inner edges of the pair of platforms, and the supporting plate is connected to the pair of platforms and supports the pair of posts.

2. The end cap assembly structure according to claim 1, wherein each of the elastic arms comprises an inclined guiding block disposed on one side of the clamping slot; and the shell of the end cap comprises a chamfered surface disposed on one side of each of the posts, and the inclined guiding block abuts against the chamfered surface.

3. The end cap assembly structure according to claim 1, wherein the snapping hole is located in a middle position of a cross section of the metal sheet.

4. The end cap assembly structure according to claim 1, wherein a holding slot is disposed between the pair of posts, and one side of the clamping slot of each of the elastic arms is inserted in the holding slot.

5. The end cap assembly structure according to claim 1, wherein each of the pair of platforms comprises a groove.

6. The end cap assembly structure according to claim 5, wherein each of the blocks of the end cap is disposed corresponding to the groove, and each of the blocks is extended to snap into the groove.

7. The end cap assembly structure according to claim 1, wherein the shell comprises a sliding slot disposed on one side of each of the platforms, and the guiding shield is inserted in the sliding slot.

\* \* \* \* \*